United States Patent [19]

Davis, Jr.

[11] Patent Number: 5,120,019

[45] Date of Patent: Jun. 9, 1992

[54] VALVE

[75] Inventor: James C. Davis, Jr., Carlisle, Mass.

[73] Assignee: Brooks Automation, Inc., North Billerica, Mass.

[21] Appl. No.: 701,512

[22] Filed: May 16, 1991

Related U.S. Application Data

[63] Continuation-in-part of Ser. No. 389,182, Aug. 3, 1989, abandoned.

[51] Int. Cl.⁵ .............................................. F16K 3/10
[52] U.S. Cl. .................................... 251/193; 251/204
[58] Field of Search ................... 251/193, 203, 204

[56] References Cited

U.S. PATENT DOCUMENTS 4,721,282 1/1988 Shawver et al. ............... 251/193 X 5,002,255 3/1991 Sawa et al. ........................ 251/193

Primary Examiner—John C. Fox
Attorney, Agent, or Firm—Nields & Lemack

[57] ABSTRACT

Valve mechanism for high-vacuum clean environments, wherein a slot aperture is closed by a gage having a lever. Motion of the gate which covers and uncovers the slot is imparted to the gate by longitudinal movement of the lever. Motion of the gate which seals and unseals the slot is imparted by pivoting movement of the level about a fulcrum near the center of the lever. The pivoting movement is imparted at a time different from that at which the longitudinal movement is imparted, and the pivoting movement may be imparted by means separate from that which imparts the longitudinal movement.

9 Claims, 5 Drawing Sheets

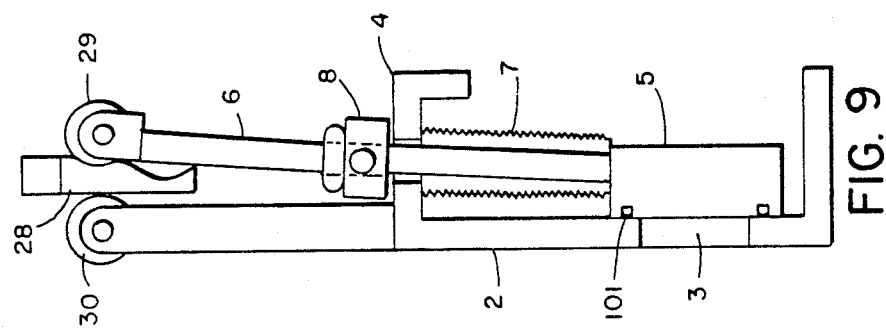
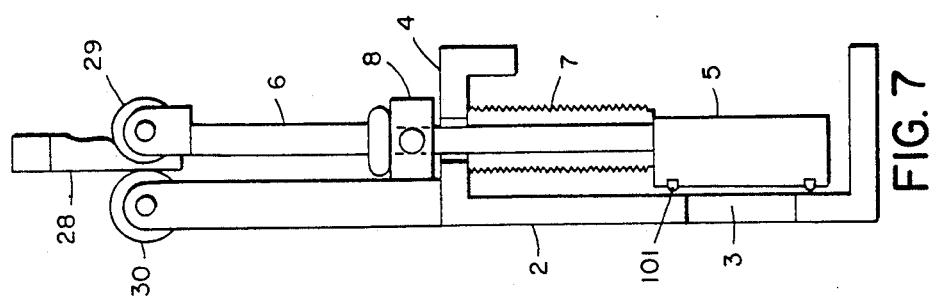
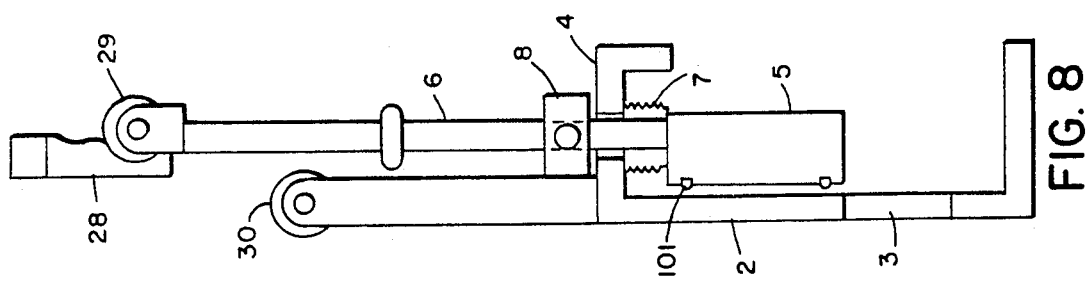

VALVE

This is a continuation-in-part of application Ser. No 389,182, filed Aug. 3, 1989 now abandoned.

BACKGROUND OF THE INVENTION

In the field of processing of wafers for the production of semiconductor devices, the wafers must be processed in a vacuum environment for such steps as ion implantation. Yet production-line requirements dictate rapid movement of the wafers from one work station to another, and therefore between vacuum environments and atmospheric environments. Such movement of the wafers has required the use of valve mechanisms which should be able to open and close so as to provide vacuum-tight seals, and which also should be made of such materials and so constructed that pollution of the vacuum by escape of particles, etc. is kept to a minimum. Conventional valve mechanisms inherently generate unwanted particles as a result of friction between the moving parts as the valve is opened and closed.

Prior art valves which close an aperture have an aperture-closing member the movement of which against the aperture to be closed involves some sliding contact. While perfectly acceptable for many applications, such sliding contact has undesirable effects in vacuum environments, particularly the high-vacuum, clean atmosphere required for semiconductor wafer manufacture. Recently attempts have been made to design valves suitable for such high-vacuum, clean environments. One such attempt is the so-called "monovat" slit valve manufactured by VAT Aktiengesellschaft in Haag, Switzerland. This monovat valve attempts to improve valve structure by causing the aperture-closing member to move in only one dimension: the apertured member is stepped in the vicinity of the aperture, and the motion of the aperture-closing member is across, rather than against, the aperture, sealing partly against one seat on the inner wall of the aperture and partly against another seat on the exterior wall of the aperture. Another such attempt is shown in PCT patent publication No. WO90/08275 published Jul. 26, 1990 entitled "Valve Body for Non-sliding Gate Valve" and Japanese patent publication No. 63/254275 published Oct. 20, 1988 entitled "Sliding-free High Vacuum", both in the name of Irie Koken Kabushiki Kaisha. These patent publications disclose valve structures wherein the aperture-sealing mechanism is completely separate from the aperture-covering mechanism and uses compressed air directly to seal the gate against the aperture.

Another gate valve is disclosed in U.S. Pat. No. 4,721,282 to Shawver et al. As in Applicant's device, the Shawver et al. device separates translational movement of the gate from lateral movement thereof; i.e. it separates the slot-covering motion from the sealing motion. However, the mechanism employed differs from Applicant's mechanism in the following respects.

To seal the gate, Shawver et al. employs a link assembly which pushes a shaft, supported in cantilever, so that a gate member at the end thereof is pushed against the slot. Far from relying on springiness of the shaft, it would seem that Shawver et al. relies on stiffness of the shaft, since the gate itself is rotatably supported on the shaft by a pin (bearing no reference numeral). It would seem that the structure of the cam followers 56 in the guide tracks 58 may be the portion best adapted to provide springiness, although it may be that the O-ring alone provides adequate yield. Column 2 line 43 and column 5 line 5 refer to "over center" travel. This would suggest that any springiness is of a minor nature, easily provided by the O-ring.

Valves of the type of the present invention are used in various applications. One such application may be illustrated by U.S. Pat. No. 4,730,976, the disclosure of which is incorporated herein by reference. FIGS. 3A, 3B and 3C of that patent illustrate use of the article transfer device claimed in that patent to transfer wafers from one place to another: namely, from each of two elevators to some wafer-processing station. When such an article-transfer device is used in a vacuum environment, the valves of the invention may be used between the various components shown in said Figures: e.g. between each of the elevators and the article-transfer device, and between the article-transfer device and the work-station. Such use in a vacuum environment is shown in FIG. 4 of said patent, and valves of the type of the present invention may be used between the first elevator 51 and the vacuum chamber 61, and between the vacuum chamber 61 and the second elevator 53.

SUMMARY OF THE INVENTION

The invention provides a valve mechanism which provides a vacuum-tight seal, which can be easily opened and closed, and which generates virtually no unwanted particles by the mechanical movement involved in opening and closing the valve. A plate-like gate closes a slot-like opening in a faceplate by being moved flat against it. The valve is opened by moving the gate perpendicularly away from the faceplate by a small amount, and then, in a separate motion, moving the gate in a direction parallel to the faceplate. Thus the faceplate-parallel motion occurs without mutual contact of moving parts, and the faceplate-perpendicular motion is truly perpendicular to the moving surfaces, so that friction is not only minimized but is virtually nonexistent. The pressure which closes the valve is applied by bending of an elastic member such as a pair of rods, which in turn assures the perpendicular movement of flat surfaces against one another without frictional sliding.

The diameter of each rod should be sufficiently small, and the elastic modulus (Young's modulus) by bending should be such that the rod is springy and flexible. One of the purposes of using a thin, springy, flexible rod, is to cause the gate to be pressed flat against the slotted plate. In the device of Shawver et al., this result is achieved by the pinned structure of the mount for the gate itself. By proper choice of the diameter and elasticity of the rod of the invention the desired stress is produced by a strain (i.e. displacement of the wedge end of the rod) which is greater than a minimum value so that in the gate-sealed position the rod has an arched shape. The curvature (also referred to as "conformality" of the rod is greater, the greater the deflection at the end of the rod. In accordance with the invention, this conformality is sufficient to allow the gate to seat properly against the apertured plate. It may be noted that in the formula set forth hereinafter to express strain in terms of stress the strain is inversely proportional to the area moment of inertia, and hence is inversely proportional to the fourth power of the diameter of the rod. Thus, increasing the diameter of a rod such as that disclosed by Shawver et al. results in an extremely large decrease in the curvature of the rod at the gate-sealing position.

This is recognized by Shawver et al., since they provide a hinged mount for the gate.

In addition to the foregoing advantage, the device of the invention creates substantial flexure in a known place: i.e., substantially evenly along the length of each rod. As a result, minimal flexure is produced in other, unknown places of the device. Although it has been speculated herein that Shawver et al.'s flexure occurs in the guide tracks 58, it is not known that this is so, and flexures could occur at other points, some of which might result in undesirable effects.

The material of the rods of the invention should resist fatigue resulting from the successive bending to which the rods are subjected and should have sufficient tensile strength.

BRIEF DESCRIPTION OF THE DRAWINGS

FIG. 7 is a side view vertical section of the device of FIG. 1, showing the gate in closed position ready to be sealed; FIG. 8 is a view similar to that of FIG. 7, showing the gate in open position; and FIG. 9 is a view similar to that of FIG. 7, showing the gate in sealed position.

DETAILED DESCRIPTION OF THE INVENTION

Figure 1:
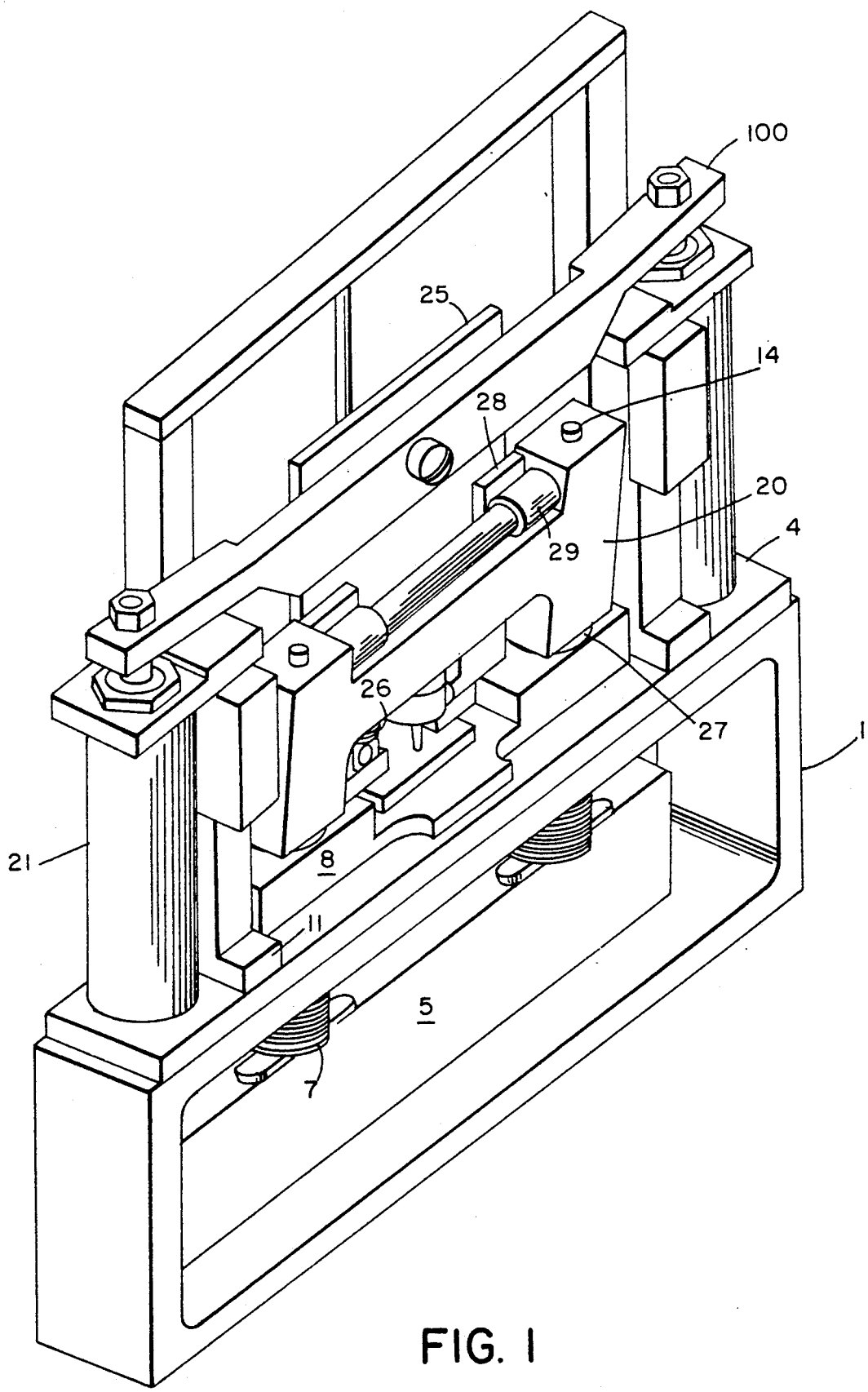
FIG. 1 is an isometric view of a device showing one embodiment of the invention, somewhat similar to a rear elevation.
Figure 2:
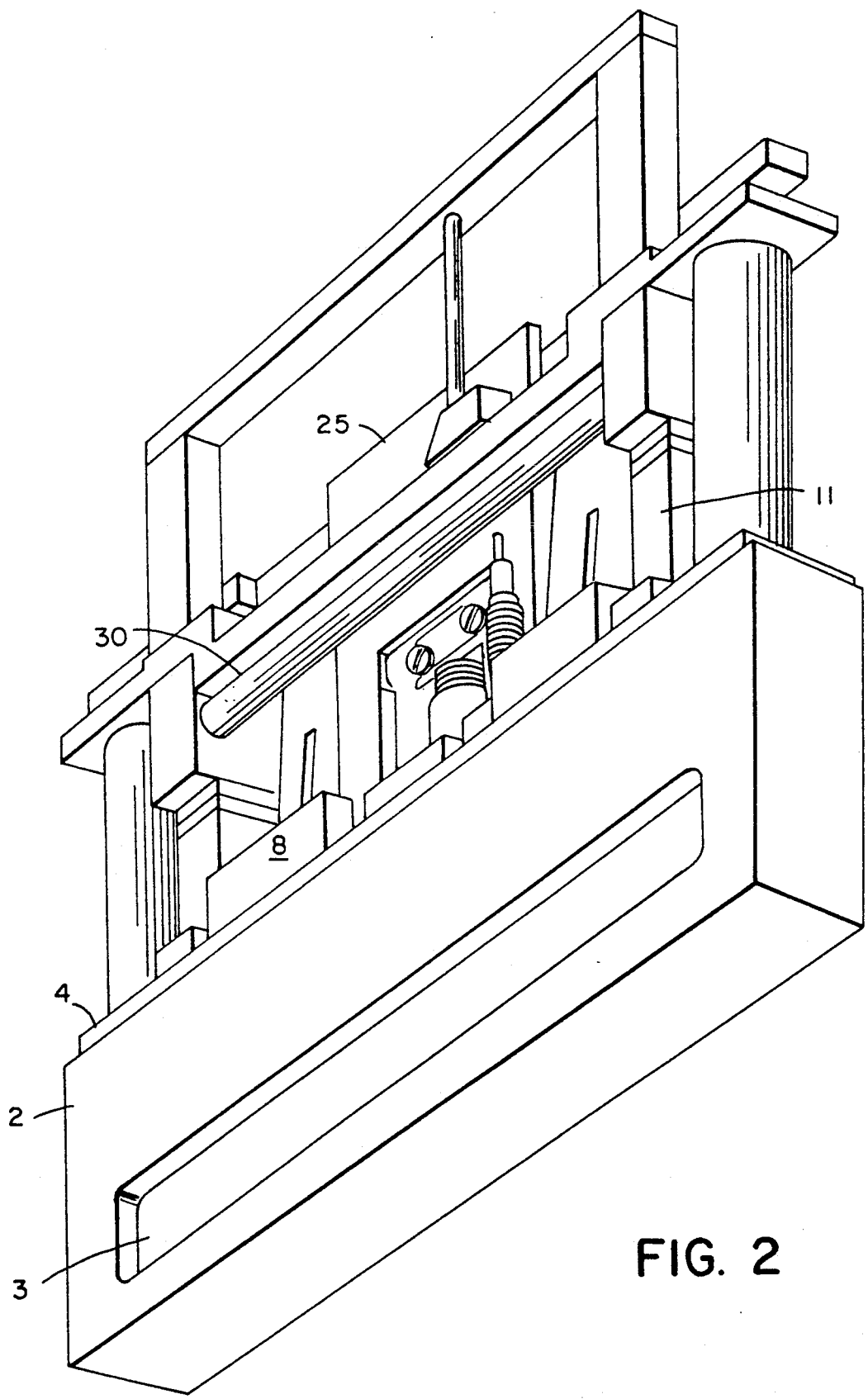
FIG. 2 is an isometric view of the device of FIG. 1, somewhat similar to a front elevation.
Figure 3:
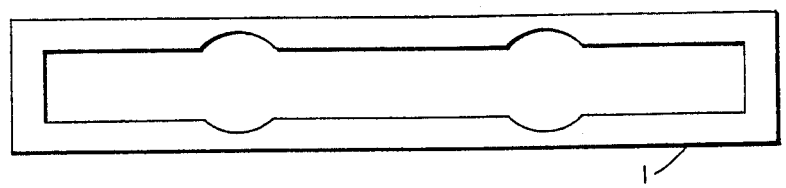
FIG. 3 is a top view of the frame of the device of FIG. 1.
Figure 5:
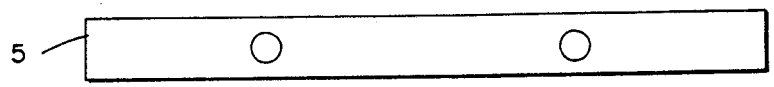
FIG. 5 is a top view of the gate of the device of FIG. 1.
Figure 6:
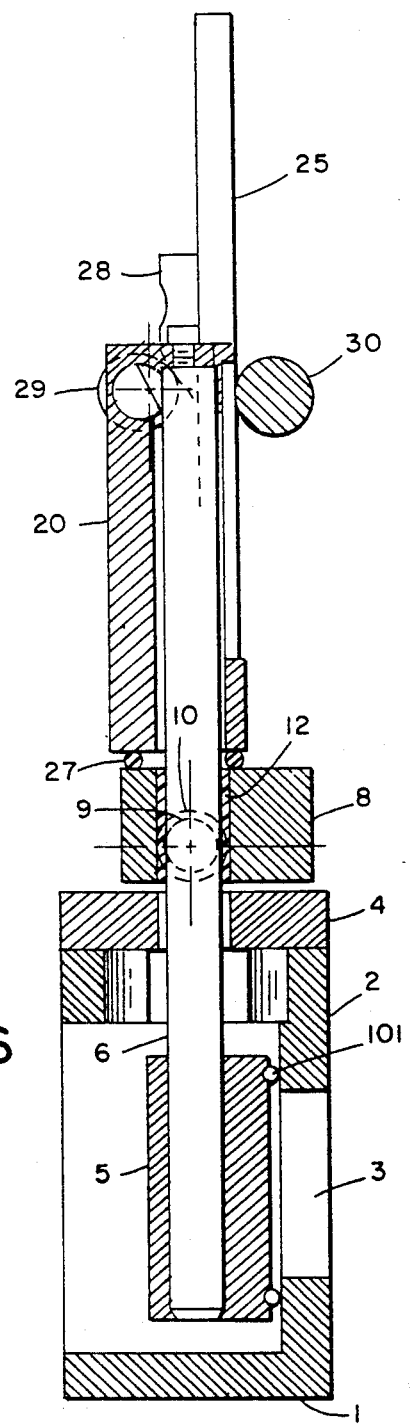
FIG. 6 is a side view vertical section of the device of FIGS. 1 and 2.

Referring to FIGS. 1 and 2, the valve mechanism of the invention operates in the following manner.

A frame 1 separates the two regions which are to be separated by the valve. Because of the properties of the valve mechanism of the invention, the thickness of the frame may be as small as one inch in a representative configuration. The frame 1 defines a rectangular aperture one side of which is partially closed by a face plate 2 having a slot opening 3 which, when the valve is open, provides a passageway between the two regions separated by the valve. The top of the frame 1 is closed by a mounting plate 4 through which mechanical movement is imparted to a gate 5 which is adapted to close the opening presented by the slot. The surface of the gate which faces the slot has a circumferential groove into which a suitable seal, such as an O-ring 101 (FIGS. 7-9) or gasket, is inserted. When the gate is pressed against the faceplate, the seal provides a vacuum-tight junction, effectively closing the aperture of the slot.

The gate is supported by two rods 6 (not visible in FIGS. 1 and 2; one is shown in FIGS. 4, 6, 7-9). The rods 6 pass through apertures in the mounting plate 4 and through bellows 7 (omitted in FIG. 6, see FIGS. 9, 10, 11) which are provided around the moveable rods 6 to give a vacuum tight seal for the apertures through which rods 6 move. A hinge block 8 is mounted on the mounting plate 4 in the following manner. The hinge block 8 itself includes axle shafts 9 (FIGS. 4 and 6) which project beyond the ends of the hinge block 8. Each axle shaft 9 is rotatably supported in a bearing member 10 (FIG. 4) within a support 11 which in turn is affixed to the mounting plate 4. The dimensions of the hinge block 8, axle shafts 9 and bearing members 10 are such that the hinge block 8 is supported by the axle shafts 9 a sufficient distance above the mounting plate 4 to permit the hinge block 8 to rotate about the axle shafts 9 by the small amount needed for pivoting of the rods 6 about the axis defined by the axle shafts 9. The hinge block 8 thus provides the fulcrum for the pivoting motion of the rods 6. The rods 6 extend through compression bearings 12 (FIGS. 4, 6) which provide the fulcrum, mounted within the hinge block 8. Although the hinge block 8 provides a fulcrum at the areas where the rods 6 pass through the hinge block 8, these passageways must permit vertical movement of the rods 6. That vertical movement is imparted to the rods 6 via a yoke 20 to which the rods 6 are affixed. The yoke 20 itself is part of a structure which includes means for imparting pivoting motion to the rods 6 in the following manner.

Vertical movement is imparted by two air cylinders 21 to a cross-bar 100. A cam plate 25 is directly mounted on .he cross-bar 100 so as to be affixed thereto. The yoke 20 is slidably mounted on the cam plate 25, and is also connected thereto by at least one spring 26. This spring 26 can assist in causing the yoke 20 to follow the downward movement of the cam plate 25 and cross-bar 100 as they are pushed downward by the air cylinders 21 until the movement of the yoke 20 ceases when the stops 27 mounted on the yoke 20 strike the hinge block 8. Thereafter, the spring 26 extends as the cam plate 25 continues its descent, wedges 28 mounted on the cam plate 25 engage rollers 29 mounted on the yoke 20, and the moving wedges 28 force the yoke 20 sideways so as to seal the slot opening 3 by the pivot movement of the rods 6.

Figure 4:
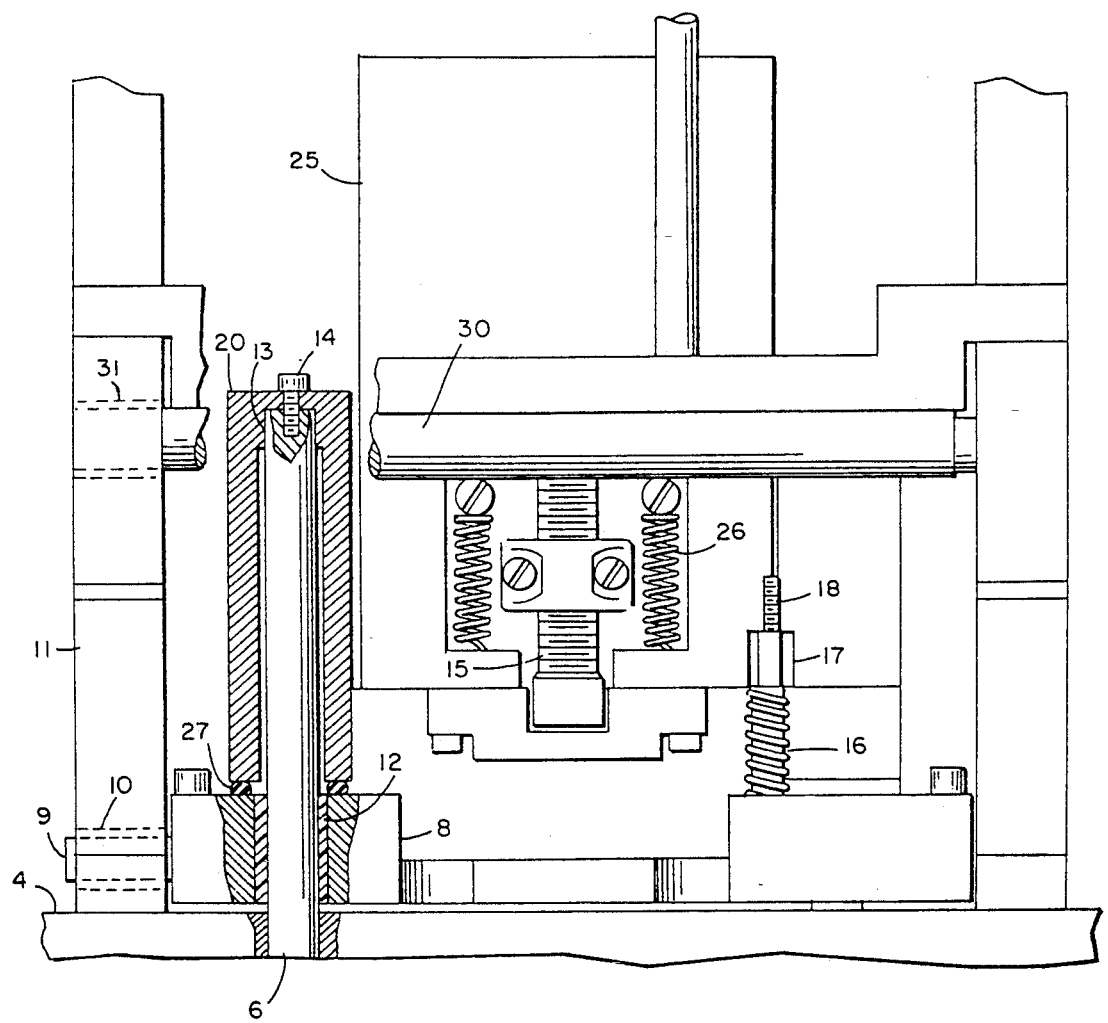
FIG. 4 is a front elevation of a portion of the device of 2, showing said portion in greater detail and on an enlarged scale.

As the downward movement of the wedges 28 pushes the yoke 20 sideways, the reactive lateral force on the wedges 28 is opposed by the static roller 30 rotatably affixed to support 11 by means of a suitable bearing 31 (FIG. 4).

Vertical movement of the rods 6 does not occur at the same time as the pivoting motion thereof. This makes it possible to provide sturdy support for the upper portions of the rods 6 during the pivoting motion. Thus, when the rods 6 are in their lowermost position, at which position the gate 5 is opposite the slot 3, the lower surface of the yoke 20 engages the upper surface of the hinge block 8, so that the hinge block 8 and the yoke 20 are firmly supported against one another. This stiffens the vertical compliance of the rods 6, minimizing any tendency to "scuffing" of the seal and thereby ensuring that the gate 5 presses against the face plate 2 in a "flat" manner.

Since it is the springiness of the rods 6 which imparts the sealing force to the gate 5 against the face plate 2, the rods 6 must be firmly supported in the yoke 20 for lateral movement. In the embodiment of the invention shown in FIGS. 1, 2, 4 and 6, each rod 6 is force-fitted into a recess 13 in the yoke 20, and further affixed thereto by a suitable screw 14. (See FIG. 4) The bearing 12 in the hinge block 8 is made of nylon or other suitable material which permits relative axial sliding movement while also providing a firm lateral fit. It should be noted that the axial movement of the rod 6 through the bearing 12 does not occur at the same time as the lateral pressure, since the pivoting movement which seals the slot opening 3 occurs only after the sliding movement which puts the gate in the covered position has been completed.

As the pivoting movement is applied to the rods 6 to seal the slot opening 2, force is exerted to bend the rods 6 at a relatively measured speed. However, as the gate is opened, the action of the unbending rods 6 against the wedges 28 is such as to impart a relatively high translational velocity to the cam plate 25. Since the cam plate 25 was separated from the yoke 20 as the gate was sealed, acceleration of the cam plate 25 through this separation distance during unsealing of the gate can result in acquisition by the cam plate 25 of high velocity by the time the cam plate 25 strikes the yoke 20. Accordingly, a suitable shock absorber 15 may be provided to reduce the impact of the cam plate 25 against the yoke 20 during the unsealing operation.

In order to ensure that the gate 5 is moved away from the slot 3 before the rods 6 lift the gate 5 away from the covered position, a spring 16 is provided to push against the hinge block 8 in a direction such that when the rods 6 are in a relaxed state the gate 5 is moved away from the slot 3. The spring 16 is supported between the hinge plate 8 and a stop 17 which is provided on a small rod 18 affixed to the mounting plate 4 and passing through an aperture in the hinge plate 8.

Significant features of the invention include the removal of nearly all moving parts from the vacuum region of slot closure, and the separation of the motion which causes the gate to cover or uncover the slot from the motion which seals the slot opening. These features are made possible by the use of one or a few levers, which are well adapted to vacuum-tight longitudinal movement through the enclosing wall of the vacuum chamber and to compressive force of the gate against the slot opening by pivot action.

The action of the lever of the invention may be described with reference to FIGS. 7 through 9. Referring thereto, FIG. 8 shows the gate in the open position. In this open position the gate 5 has been moved so as to uncover the slot aperture 3, so that wafers may be transported through the slot aperture 3 without hindrance. Each of the rods 6 acts as a lever, and the mechanical principles involved will now be set forth with reference to the single rod 6 shown in FIGS. 7-9. In FIG. 8 the rod 6 is in the uppermost position, with the bellows 7 compressed. Assuming that the frame 1 is in a position such that the face plate 2 is in a vertical position, the longitudinal motion of the rod 6 will be in a vertical direction, and the front surface of the gate 5 will be in a vertical position spaced slightly from the face plate 2. The spacing between the face plate 2 and the front surface of the gate 5 need only be sufficient to avoid frictional contact between them as the gate 5 moves vertically, and considerations of compactness suggest that the spacing should not be any greater than necessary. Of course, the face plate need not be in a vertical position; the foregoing assumption of a vertical position is made only to simplify the description. The important consideration is the separate movements of the lever: longitudinal movement to cover and uncover the slot opening, and pivoting movement to seal the slot opening.

In FIG. 7 the rod 6 is in the lowermost position, with the bellows extended and the roller 29 lined up with the wedge 28. The gate 5 is also lined up with the slot opening 3 so as to cover it. However, the wedge 28 is not pushing against the roller 29, and the rod 6 is not under any stress.

In FIG. 9 the rod 6 is still in the lowermost position, but the wedge 28 has been pushed down so as to push against the roller 29, and the rod 6 is subjected to the following forces. At the top of the rod the wedge 28 exerts a force to the right against the rod 6; at the hinge block 8 the bearing 12 within the hinge block 8 around the rod 6 is subjected by the rod 6 to a force to the right and the bearing 10 which surrounds the shaft 9 of the hinge block 8 is subjected by the shaft 9 to a force to the right; and the pivot motion of the rod 6 about the fulcrum causes the bottom of the rod 6, and the gate 5 mounted thereon, to exert a force to the left, so that the slot opening 3 is sealed. If the valve is to be positioned between a vacuum region and an atmospheric region in a direction such that the atmosphere tends to open the seal, then the force against the sealing surface must overcome the force of atmosphere (i.e., 15 pounds per square inch times the area of the slot opening) plus a moderate additional force for compressing the seal. If the valve is positioned in a direction such that the atmosphere tends to close the seal, only the initial compression force to compress the seal is needed. For example, if the slot opening is 1.5 inches wide and 9.00 inches long, the resultant area times atmospheric pressure times 133% for safety gives a force of about 270 pounds, which is divided among the rods 6. Thus, if there are two rods 6, each must withstand 135 pounds during pivot motion; and the bearings must withstand a total of 540 pounds, divided among them (e.g., in the device of FIGS. 1 and 7, 270 pounds for each of the two bearings 12 around the respective rods 6 and 270 pounds for each of the two bearings 10 around the respective shaft-ends 9).

First, assuming only one wedge and one rod, the wedge exerts a force Fw to the right and as the resulting pivot motion pushes the gate against the apertured wall the wall resists with a force Fg to the right. The bearing exerts an opposing force Ff at the fulcrum. Assuming the fulcrum to be located midway between the application of the wedge force and the application of the gate force, the fulcrum force Ff will be twice the wedge force, which is equal to the gate force. As indicated, the total force required is 270 lbs. If there are two rods, each must support 135 lbs. When this force is applied by the wedges, each rod will bend as though it were supported at the wedge and at the gate aperture and bearing a load at the fulcrum of twice the force applied by the wedge: namely, a load of 270 lbs. The deflection required to be imposed by the wedge in order to apply the force required is a function of the dimensions of the rod and the elasticity of the rod. The deflection required is thus given by the formula $Ff^3/48EI$, where Ff is the force applied at the fulcrum of a rod in psi, E is Young's modulus for bending in psi, L is the length of a cylindrical rod in inches, and I is the area moment of inertia in square inches and equal to $0.049 D^4$ where D is the rod diameter in inches. For a force at the fulcrum of 270 lbs, a length of 7 inches, a diameter of ⅜ inch and an elasticity (E) (i.e. Young's modulus) of $30 \times 10^6$ psi (the elasticity of 440 stainless steel) the deflection required at the center is 0.064 inch, and so the movement caused by Fw at the end of the rod must be twice this, or 0.128 inch, after the O-ring is seated. Thus high elasticity reduces the deflection required to produce the required force. However, it is also necessary that the tensile strength of the material used for the rod be high enough to avoid breakage (preferably in the range 200 to 30 kpsi), and this material must not have excessive fatigue properties. A suitable material is hardened 440 stainless steel. Other suitable materials include various ferrous spring rods.

Choice of appropriate materials for the lever mechanism of the invention will be well known to those skilled in the mechanical arts from the aforementioned guidelines. The surfaces of the cams and cam blocks must be durable; the rods must be relatively stiff but somewhat elastic; the bearings must be somewhat resilient to accommodate slight bending of the rod when it is under stress, and the bearings around the rods must be durable as against sliding motion of the rod, whereas the bearings around the shafts must be durable as against rotation of the shafts. Stainless steel is a preferred material for the rods. Any number of well-known acetyl or nylon materials may be used for the bearings. The face of the cam blocks may be stainless steel, supported on aluminum to permit yieldable bending as the rod bends under stress.

In the device shown in FIGS. 1 and 2 vertical movement is imparted to the cam plate 25 by the action of the air cylinders 21 operating on a cross-bar 100 affixed to the cam plate 25. In such a construction pneumatic means are thus used to impart vertical movement to the cam plate 25, and the construction is such that the rods 6 and the yoke 20 receive vertical movement from the vertical movement of the cam plate 25, and the wedge action converts such vertical movement into pivot motion at the appropriate time. Alternative sources of power will be readily apparent to those skilled in the art. For example, the cam plate 25 may be moved manually, either directly or with the assistance of an appropriate lever mechanism. Alternatively, electric power may be used for this purpose. In the parent application, Ser. No. 389,182 filed Aug. 3, 1989, now co-pending herewith, a device was described in which electrical means provided the power for vertical movement, and separate electrical means were provided for pivoting motion. The disclosure of said parent application is hereby incorporated herein by this reference thereto as to all subject matter disclosed therein.

Having thus described the principles of the invention, together with several illustrative embodiments thereof, it is to be understood that although specific terms are employed, they are used in a generic and descriptive sense, and not for purposes of limitation, the scope of the invention being set forth in the following claims.

I claim:

1. A gate valve, comprising in combination a face plate adapted to form a boundary of a vacuum region and having an aperture to be sealed, a mountings plate supported substantially perpendicular to said face plate and having at least one access aperture closed by a flexible seal, a hinge block pivotally mounted on said mounting plate outside said vacuum region about a hinge axis in the vicinity of said access aperture, said hinge block including a bearing adapted to receive a rod therethrough so as to provide a fulcrum for pivot motion of said rod while permitting sliding motion of said rod within said bearing, a rod having a yoke mounted at one extremity thereof and laterally confined within said bearing and passing sealingly through said flexible seal, a gate member supported on said rod at the opposite extremity thereof in cooperative relationship with said aperture, means for imparting longitudinal movement to said yoke so as to move said gate member between a position covering said aperture and a position not covering said aperture, and means for imparting lateral movement to said yoke after said gate member is in said position covering said aperture so as to pivot said rod together with said hinge block about said hinge axis so as to move said gate member between a position sealing said aperture and a position not sealing said aperture.

2. Apparatus in accordance with claim 1, wherein said means for imparting longitudinal movement comprises a cam plate connected to said yoke by springs and means for driving said cam plate, and wherein said means for imparting lateral movement comprises a fixed backing mounted on said mounting plate and cam means on said cam plate, said yoke including a cam-means follower which is pushed by said cam means laterally as the cam means travels past said cam-means follower between said cam-means follower and said fixed backing.

3. Apparatus in accordance with claim 2 wherein said cam means is a cam and said cam-means follower is a cam follower.

4. Apparatus in accordance with claim 2 wherein said cam means is a wedge and said cam-means follower is a roller.

5. Apparatus in accordance with claim 4 wherein said wedge includes a recess adapted to receive and restrain said roller when said gate member is in a position sealing said aperture.

6. Apparatus in accordance with claim 5 including a shock absorber operatively mounted between said cam plate and said yoke to absorb shock caused by rapid longitudinal movement of said cam plate upon its release from said restraint.

7. Apparatus in accordance with claim 1, wherein said hinge block includes at least two bearings and wherein said valve includes at least two rods.

8. Apparatus in accordance with claim 1, wherein the conformality of said rod when said aperture is sealed is sufficient for flat contact between said gate and said face plate.

9. Apparatus in accordance with claim 4 wherein said rod has a tensile strength of 200 to 300 kpsi and an elasticity of $30 \times 10^6$ psi.

* * * * *